United States Patent
Akiti et al.

(10) Patent No.: US 7,293,023 B1
(45) Date of Patent: Nov. 6, 2007

(54) METHOD FOR EVALUATING DATA IN ELEMENTS OF A COMMUNICATIONS NETWORK

(75) Inventors: Tetteh Akiti, Lenexa, KS (US); Debashis Talukdar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 468 days.

(21) Appl. No.: 10/793,364

(22) Filed: Mar. 4, 2004

(51) Int. Cl.
*G06F 17/30* (2006.01)

(52) U.S. Cl. .................. 707/8; 379/901; 382/309

(58) Field of Classification Search ............ 707/102, 707/201, 202; 715/513; 726/13; 713/201; 714/38; 717/168–178; 379/9, 1, 10
See application file for complete search history.

(56) References Cited

U.S. PATENT DOCUMENTS

| | | | | |
|---|---|---|---|---|
| 5,434,932 A | * | 7/1995 | Scott ........................... | 382/309 |
| 5,651,111 A | * | 7/1997 | McKeeman et al. .......... | 714/38 |
| 7,130,382 B2 | * | 10/2006 | Thacker et al. ............. | 379/9.01 |
| 2004/0073811 A1 | * | 4/2004 | Sanin ......................... | 713/201 |
| 2004/0148569 A1 | * | 7/2004 | Sengodan ................... | 715/513 |

OTHER PUBLICATIONS

Mark A. Cortner, What you don't know can cost you: Testing wireless networks for revenue assurance, Oct. 12, 1998, pp. 1-3.*
Reid Simmons et al., Towards Automatic Verification of Autonomous Systems, pp. 1-6.*
Colby et al., A Telecommunications Case Study in Java, Apr. 1998, pp. 1-15.*
(date unknown) http://www.inetdaemon.com/tutorials/internet/ip/routing/define_router.shtml.*
"Comparison of file comparison tools," Wikipedia via website http://en.wikipedia.org/wiki/Comparison of file comparison tools.

* cited by examiner

*Primary Examiner*—Yicun Wu

(57) ABSTRACT

A method, computer-program product, and user interface are provided for verifying correct translations data network elements. Translation-verification commands are executed in batch to receive a group of data sets, which are stored in a capture file. A benchmark file is provided that contains correct translations data. Both files, or derivatives thereof, are synchronizing and automatically comparing to each other to identify any data mismatches. Entities associated with the network elements of interest are automatically notified of the mismatches as well as details related to the mismatches. Erroneous routing information is automatically identified in the network elements. Persons are notified automatically of errors or network anomalies.

18 Claims, 14 Drawing Sheets

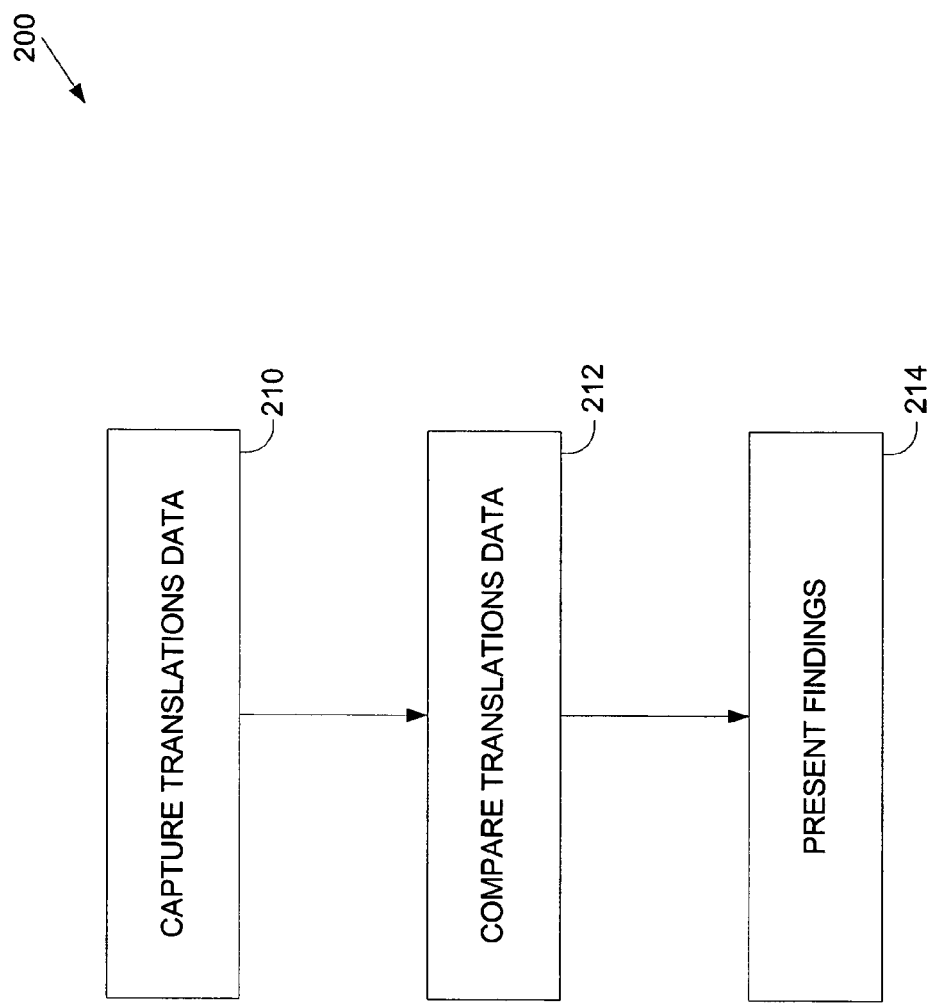

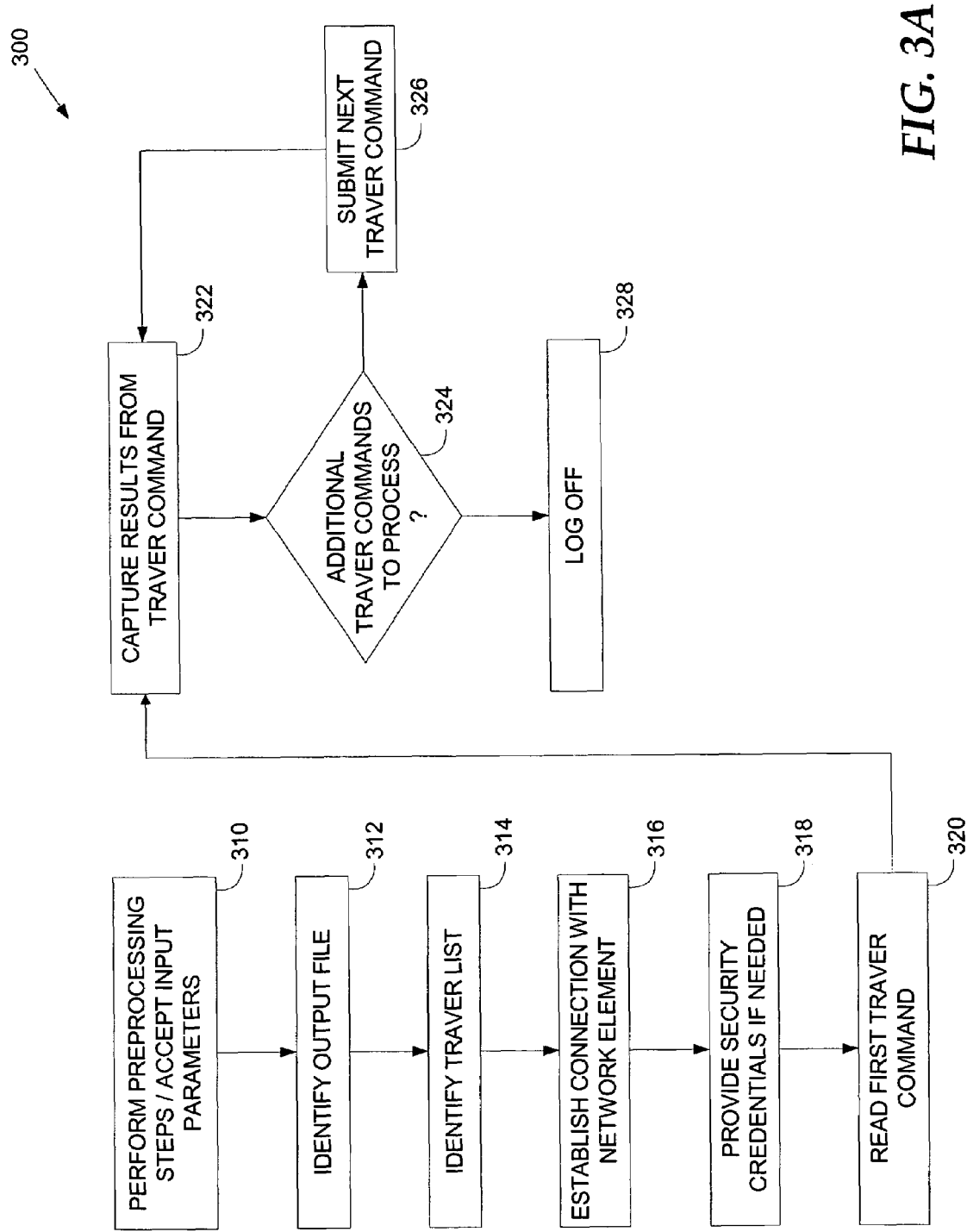

*FIG. 6*

| | THDLORXADS0 | WHCYORXDS0 | WRBGMOXADS0 | | |
|---|---|---|---|---|---|
| | | | | The Dalles, OR | ☐ |
| 29 | | | | White City, OR | ☐ |
| 30 | | | | Warrensburg, MO | ☐ |
| 31 | | | | | |
| 32 | LSVGNVXVDS0 | | | Las Vegas South South (361), NV | ☐ |
| 33 | LSVGNVXWDS0 | | | Las Vegas West West (363), NV | ☐ |
| 34 | LSVGNVXKDS0 | | | Las Vegas West 6 (367), NV | ☐ |
| 35 | LSVGNVXBDS1 | | | Vegas_Main2 (382), NV | ☐ |
| 36 | FTWOTX52DS0 | | | Dallas-F.Worth, TX | ☐ |
| 37 | LSVGNVXRDS0 | | | Las Vegas East 1 (451), NV | ☐ |
| 38 | LSVGNVXMDS0 | | | Las Vegas East 7 (457), NV | ☐ |
| 39 | LSVGNVXIDS0 | | | Las Vegas East 2 (459), NV | ☐ |
| 40 | HNSNNVXFDS0 | | | Henderson, NV | ☐ |
| 41 | NLVGNVXFDS1 | | | Las Vegas North 2 (642), NV | ☐ |
| 42 | NLVGNVXGDS0 | | | Las Vegas North 3 (644), NV | ☐ |
| 43 | LSVGNVXUDS0 | | | Las Vegas North 5 (645), NV | ☐ |
| 44 | LSVGNVXTDS0 | | | Las Vegas North 8 (646), NV | ☐ |
| 45 | LSVGNVXGDS0 | | | Las Vegas South 5 (735), NV | ☐ |
| 46 | LSVGNVXLDS0 | | | Las Vegas South 6 (736), NV | ☐ |
| 47 | LSVGNVXGDS1 | | | Las Vegas South 7 (737), NV | ☐ |
| 48 | LSVGNVXHDS0 | | | Las Vegas West 8 (878), NV | ☐ |

Update — 612

610

METHOD FOR EVALUATING DATA IN ELEMENTS OF A COMMUNICATIONS NETWORK

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of determining whether routing information is correct in a communications-networking environment. More particularly, the present invention relates to automatically identifying erroneous translation information stored in network components.

BACKGROUND OF THE INVENTION

A telecommunications network or group of networks are made up of many devices and components that collectively communicate data from a desired starting point to a termination point. A common network element is a telecommunications switch. A switch, or switching system, can take the form of a mechanical, electrical, or electronic device that opens or closes circuits, completes or breaks electrical paths, or selects paths or circuits upon which to communicate data. Switches can be used in connection with a circuit-based network or a packet-based network.

For data to be routed correctly, correct translation (alternatively "translations") information must be in place. The act of "translation" refers to the interpretation by a switching system of all or part of a destination code to determine the routing of call or data traffic. "Translation information" refers to information related to routing data through a communications network. If translations data is wrong, a variety of problems can occur, not limited to calls dropped, data lost, busy signals, and other types of service interruptions.

Ensuring that correct translation information is present in a communications network is a task persistently pursued by telecommunications carriers. Currently, however, verifying translation information is a difficult, time-consuming, and expensive task. Translations analysts enter translations requests. A translations request is a request to modify translation information. If a new area code is introduced into a system, for example, then analysts will submit translations requests to modify translation information so that calls will be routed properly. But because verifying translation information is a cumbersome task, a telecommunications carrier may simply not verify that the translations request was entered correctly. Some carriers may opt to manually verify translation information, but will do so at lengthy intervals because of the resource-intensive nature of processing the data associated with verifying translation information. Translation information can be gathered by submitting a translation-verification command.

A translation-verification ("traver") command can be submitted to receive back translation information. Table I illustrates a series of traver commands and data sets that are respectively returned incident to each command.

TABLE I

Command Line Traver Results

```
>traver 1 5412983439 2984567 nt
DIGIT TRANSLATION ROUTES
1 LINE                  5412984567       ST
TREATMENT ROUTES. TREATMENT IS: GNCT
1 NCAANN
2 T120
3 LKOUT
+++ TRAVER: SUCCESSFUL CALL TRACE +++
>traver 1 5412983439 411 nt
DIGIT TRANSLATION ROUTES
1 PTLDOR131GTO         411              ST2P
TREATMENT ROUTES. TREATMENT IS: GNCT
1 NCAANN
2 T120
3 LKOUT
+++ TRAVER: SUCCESSFUL CALL TRACE +++
>traver 1 5412983439 511 nt
TREATMENT ROUTES. TREATMENT IS: VACT
1 VCAANN
2 T120
3 LKOUT
+++ TRAVER: SUCCESSFUL CALL TRACE +++
>traver 1 5412983439 911 nt
DIGIT TRANSLATION ROUTES
1 VFG: THD911          911              ST
TREATMENT ROUTES. TREATMENT IS: GNCT
1 NCAANN
2 T120
3 LKOUT
+++ TRAVER: SUCCESSFUL CALL TRACE +++
.
.
.
>traver 1 5412983439 101022219137917000 nt
DIGIT TRANSLATION ROUTES
1 PTLDORWA3MD          9137917000       ST
2 PTLDORWA3MD2         9137917000       ST
3 EAPEG
4 NCAANN
TREATMENT ROUTES. TREATMENT IS: GNCT
1 NCAANN
2 T120
3 LKOUT
+++ TRAVER: SUCCESSFUL CALL TRACE +++
>traver 1 5412983439 101028819137917000 nt
DIGIT TRANSLATION ROUTES
1 PTLDOR62AMD6         9137917000       ST
2 PTLDOR62AMD2         9137917000       ST
3 EAPEG
4 NCAANN
TREATMENT ROUTES. TREATMENT IS: GNCT
1 NCAANN
2 T120
3 LKOUT
+++ TRAVER: SUCCESSFUL CALL TRACE +++
>traver 1 5412983439 101033319137917000 nt
DIGIT TRANSLATION ROUTES
1 UTC77PH              9137917000       ST
2 UTC77AF              9137917000       ST
3 EAPEG
4 NCAANN
TREATMENT ROUTES. TREATMENT IS: GNCT
1 NCAANN
2 T120
3 LKOUT
.
.
```

An exemplary syntax follows for a traver command (as implemented in an illustrative switch, the DMS100 switch offered by the Nortel Networks Corporation of Brampton, Ontario): : "traver L initiation point| |destination point|NT." The first parameter "L" refers to "line," but could also be "tr" for "trunk" or "v" for "virtual trunk." The second parameter, |initiation point|, can be an originating phone number or other origination address. The third parameter, |destination|, can be a destination phone number or some other target address. Finally, the last parameter "NT" represents a mode that corresponds to an amount of data returned incident to issuing the traver command. Alternatives include a "t" for "table mode"—which returns table data—or "nt" for "no tables"—which does not return table data.

As can be seen from Table I, the data returned incident to submitting multiple traver commands (manually, one after another) appears in a format that is difficult to read. If an analyst were charged with the task of confirming that the data in Table I reflects accurate translation information, then he or she would have to laboriously peruse through each line item and compare the line item against some other data set that is hopefully correct. Such a process lends itself to human error. The prior art does not offer an efficient method to verify whether current translation information is correct or whether a translation analyst's routing schemes are working correctly.

More data items than only those shown in Table I can, and often are, be returned to verify whether calls are routed correctly based on translation information. Typically, a trunk-group order is returned. An exemplary trunk-group order includes primary high, intermediate high, direct final, and ultra final. This trunk-group order corresponds to a primary route, secondary route, tertiary route, and final route. The data returned displays what trunk groups are being hit upon while data is attempting to arrive at a desired termination point. Absent the present invention, the results returned must be manually analyzed line by line, character by character. Shortcomings of the prior art are particularly visible when an outage occurs.

If some event, such as a natural phenomenon or human error, results in a service outage, then customers will be out of service until the problem is fixed. To the extent translation data is compromised, new translation data must be populated in the correct switch elements. A paramount step in the process to reestablishing service is to verify that translation information is the same as what it was prior to the outage.

A prior-art process for verifying data would involve an analyst typing in one traver command, reading each line and character of data returned, and verifying that the data returned is the same as it was prior to the outage. Such a process can consume a great deal of time, from several hours to possibly days. Meanwhile, data communications would be interrupted for the duration of the outage: emergency calls would not get through, individuals would not be able to place phone calls, access to networks such as the Internet would be disrupted, and a litany of other problems would stem from such an outage. The translations analyst must be trained to be able to interpret the data returned from issuing the traver commands.

If a network-translations analyst implemented a translations-change request, then good practice would be to verify that the new translation information corresponds to the desired change. But because issuing a traver command and then comparing the results to potentially out-dated values is a time-consuming process, such verification is often simply not made.

Absent the present invention, a carrier is often relegated to learning about translations errors from its customers. That is, when bad translation information exists in a switch, the error may not be discovered until a customer attempts to dial a phone number or otherwise communicate data traffic that relies on the correctness of the translation information. In particularly bad situations, a user's service may be so interrupted that he or she may not even be able to contact the carrier to notify them of the error. In such situations, the user may have to bear additional inconvenience of notifying the carrier from a different location.

The current state of the art could be improved by providing a method and system that allows current translation information to be compared against a defined benchmark efficiently. Moreover, a method and system are needed to allow multiple verification commands to be run in batch and have the data returned be automatically compared against benchmark data to identify any mismatches.

SUMMARY OF THE INVENTION

The present invention solves at least the above problems by providing a method and system for determining whether translation information in network elements is correct. The present invention has several practical applications in the technical arts, not limited to enabling current translation information to be automatically compared against benchmark information known to be correct, enabling multiple verification commands to be run in batch, and automatically communicating the comparison results to designated persons or entities.

In a first exemplary aspect, a method is provided for verifying translations data in a network element. A list of commands is provided that extract routing information from a network element. The list is referenced to automatically execute each command. A group of data sets that respectively correspond to the sets of data-extraction commands is stored in a capture file in one preferred embodiment. A benchmark file that contains correct translations data is synchronized with the capture file so that both files contain the same number of lines of data. Without user intervention, the data sets in the capture file are automatically compared with those in the benchmark file to identify any data mismatches.

In a second aspect, computer-readable media are provided that have computer-useable instructions embodied thereon that perform a method of troubleshooting problems in a communications network. In one embodiment, the method includes providing a first data set containing data known to be correct; retrieving a second data set containing current data from desired elements of the network; automatically comparing the first data set with the second data set; and automatically identifying discrepancies between the first data set and the second data set.

In a final aspect, a user interface for evaluating data stored in one or more elements of a communications network is provided. The user interface includes a first screen that facilitates a log-in process so that network-element information is presented to a user according to a set of credentials provided at the log-in process. A second screen allows the user to identify one or more network elements upon which routing data is to be obtained. A third screen allows the user to initiate a comparison between the routing data and benchmark routing data. Finally, a fourth screen depicts results associated with the comparison. Additionally, results can be automatically sent to a set of users via e-mail.

BRIEF DESCRIPTION OF THE SEVERAL VIEWS OF THE DRAWINGS

The present invention is described in detail below with reference to the attached drawing figures, which are incorporated by reference herein and wherein:

FIG. 2 is a high-level flowchart depicting a method in accordance with an embodiment of the present invention;

FIG. 3A provides a more detailed flowchart of the data-capture process in accordance with an embodiment of the present invention;

FIGS. 4-12 depict exemplary screenshots of a user interface in accordance with an embodiment of the present invention that illustrate various functional aspects of the present invention.

DETAILED DESCRIPTION OF THE INVENTION

Figure 1:
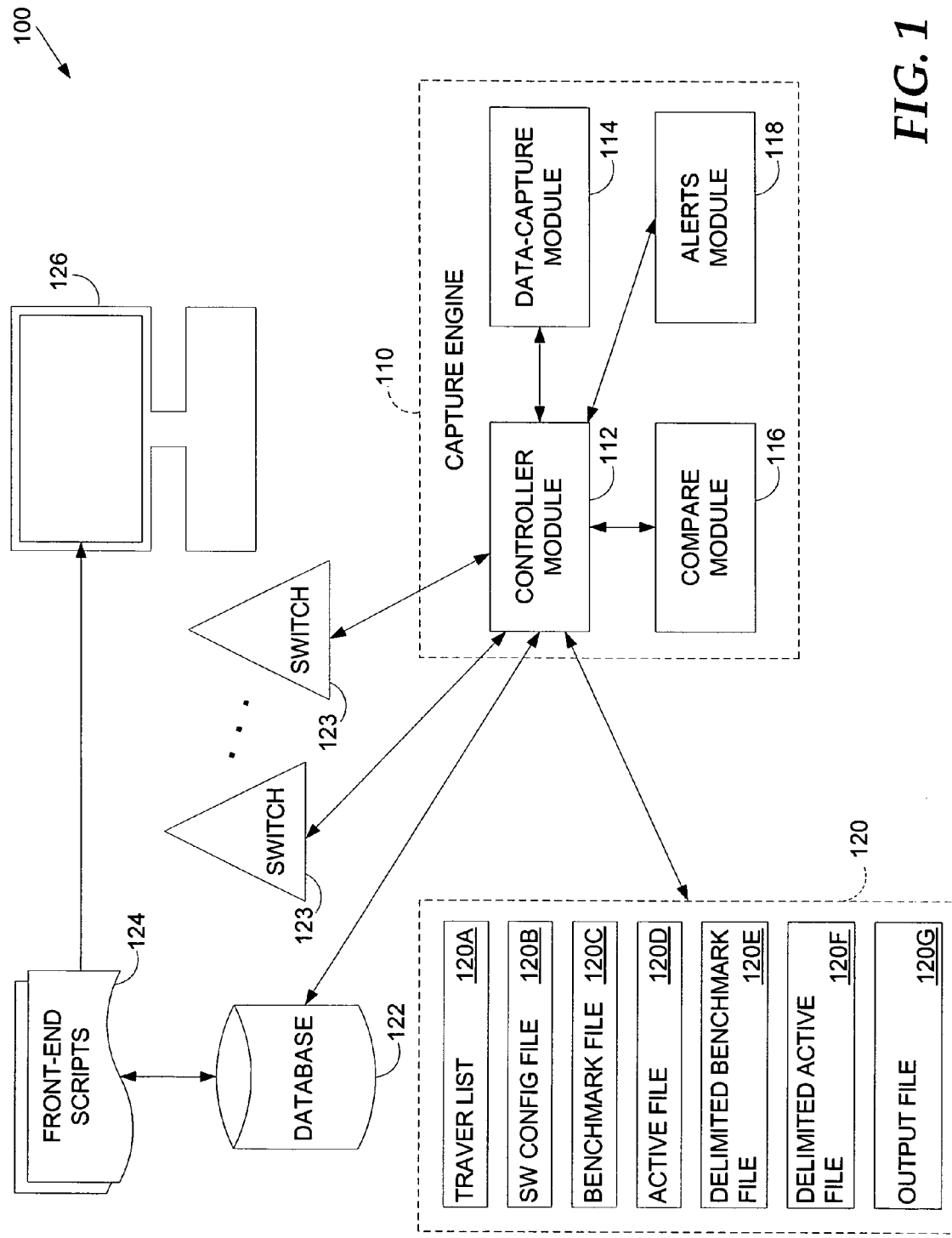
FIG. 1 is a block diagram depicting an illustrative operating environment suitable for practicing an embodiment of the present invention.

The present invention provides a method and system for verifying translation information in a telecommunications-networking environment. The present invention can be used, among other things, to troubleshoot network errors, dramatically reduce the time that has historically been associated with resolving those errors, and verify that current translation information is correct. As will be described in greater detail below, the present invention offers the ability to automatically submit multiple translations-verification commands, parse the returned data, and identify any mismatches without user intervention. The present invention also maintains an updated log related to the status of call routing on a particular switch. The results reflect a personalized audit relative to individual switch analysts.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, gateways, workstations, and other machines may be connected to one another across a communication medium including, for example, a network or networks.

Various technical terms are used throughout this description. A definition of such terms can be found in Newton's Telecom Dictionary by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the meaning of the words offered in the above-cited reference.

As one skilled in the art will appreciate, the present invention may be embodied as, among other things: a method, system, or computer-readable media. Accordingly, the present invention may take the form of a hardware embodiment, a software embodiment, or an embodiment combining software and hardware.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

To help explain the invention, a preferred embodiment will now be referenced in connection with a communications network. FIG. 1 illustrates an exemplary operating environment suitable for practicing the present invention and is referenced generally by the numeral 100. Operating environment 100 should not be construed as a limitation of the present invention. Additional components that can be used in connection with the present invention are not shown so as to not obscure the present invention.

Operating environment 100 includes a capture engine 110, which includes a controller module 112, a switch data-capture module 114, a compare module 116 and an alert module 118, each of which will be described in detail below. A set of configuration files 120 interacts with capture engine 110, to communicate with data stored in a database 122, which can include user information, switch information, routing information, and more. Capture engine 110 also communicates with one or more switches 123 to retrieve current routing information if applicable. A set of front-end scripts 124, which are preferably Web scripts, communicate with database 122 and configuration files 120 to present data on a workstation 126. Functionality offered by each of these modules will now be explained in greater detail.

In the embodiment shown in FIG. 1, configuration files 120 include seven types of files: a traver list 120A, a switch-configuration file 120B, a benchmark file 120C, an active file 120D, a delimited benchmark file 120E, a delimited active file 120F, and an output file 120G. The depiction of configuration files 120 in FIG. 1 should not be construed as limited to the embodiment shown. The different files depicted are shown so as to aid understanding of the present invention. The precise number of different configuration files is not fixed. For example, diagrammatic blocks shown as different files may actually be subsets of a single file. The same principle is equally applicable to the illustrative blocks shown that compose capture engine 110. That is, the different modules (112, 114, 116, and 118) are not necessarily distinct programs but are depicted in such a way that simplifies referencing and understanding of the present invention. The various modules may be independent of one another or subsets of larger programs but, in either case, offer the functionality disclosed herein.

Turning now to FIG. 2, a high-level overview of a method in accordance with an embodiment of the present invention is referenced generally by the numeral 200. As shown, translations data is captured at a step 210. Translations data is retrieved from one or more network elements, such as switch 123. The translations data is then automatically compared against data known to be correct at a step 212. This allows any mismatches to be identified. Finally, findings are presented at a step 214, which includes automatically notifying designated persons or entities. A more detailed explanation of the steps described in FIG. 2 will now be provided with reference to a preferred embodiment. It should be appreciated that the following more detailed description is illustrative in nature and while different steps, processes, and pseudo code depictions are provided, they are done so in an exemplary fashion to explain the present invention. Not all steps are depicted so as not to obscure the present invention. Similarly, some steps depicted by distinct boxes can be collapsed and carried out as a single process or in parallel with other processes as would be apparent to a skilled artisan.

Turning now to FIG. 3A, a more detailed process of capturing translations data is provided and referenced generally by the numeral 300. At a step 310, capture engine 110 performs a set of preprocessing steps that includes accepting various input parameters. The exemplary input parameters include network addresses of necessary components such as switch 123 and any gateways, routers, or other network elements that are used to access switch 123. In a preferred embodiment, the following parameters are received at a step 310: a gateway IP address, a gateway user ID, a gateway password, a switch index, a switch user ID, a switch password, an indication of traver list 120A, and an indication of active file 120D. The gateway IP address is the address of a gateway that helps provide security measures to the end network element, which in this case is switch 123. Thus, a gateway user ID and password, or other security credentials, are provided to gain access through a gateway that offers such protection. The switch index is a switch identifier and can assume a variety of forms so as to indicate which switch or group of switches 123 are to be queried. To the extent a switch 123 has additional security measures in place, credentials such as a switch user ID and switch password are received as parameters so they can be provided, and access to switch 123 granted.

Traver list 120A includes a list of network translations commands to be run. Exemplary network translations commands were provided with reference to Table I in the background section above. However, the present invention provides the ability to run traver commands in batch. Thus multiple traver commands can be provided in traver list 120A. An illustrative set of traver commands is provided in Table II below.

TABLE II

Exemplary Traver List traver 1 5412983439 2984567 nt
traver 1 5412983439 411 nt
traver 1 5412983439 511 nt
traver 1 5412983439 911 nt
traver 1 5412983439 101022219137917000 nt
traver 1 5412983439 101028819137917000 nt
traver 1 5412983439 101033319137917000 nt
traver 1 5412983439 101022201181335000000 nt
traver 1 5412983439 101028801181335000000 nt
traver 1 5412983439 101023301181335000000 nt
traver 1 5412983439 14022902075 nt
traver 1 5412983439 01181335401212 nt Table II depicts an illustrative set of translation-verification commands. As previously mentioned, each traver command includes an origination address and a destination address that define a pathway upon which translation information is to be gathered. A user may enter as many traver commands as desired, and return as much detail as desired. An abridged listing of routing expectations is presented in Table III below. The illustrative summary of Table III is an elaboration of the how the results from the travers in Table I would be interpreted. Table II contains the set of commands that would need to be executed to return the results such as those shown in Table I.

TABLE III

Exemplary Routing Interpretations

| | | |
|---|---|---|
| A Call from 5412983439 to 2984567 | will hit a LINE | 5412984567 |
| A Call from 5412983439 to 411 | will hit the trunk group | PTLDOR131GTO |
| A Call from 5412983439 to 511 | will go to vacant code | VCAANN |
| A Call from 5412983439 to 911 | will hit the trunk group | VFG: THD911 |
| A Call from 5412983439 to 101022219137917000 | will hit the trunk group and roll over to | PTLDORWA3MD PTLDORWA3MD2 |
| A Call from 5412983439 to 101028819137917000 | will hit the trunk group and roll over to | PTLDOR62AMD6 PTLDOR62AMD2 |
| A Call from 5412983439 to 101033319137917000 | will hit the trunk group and roll over to | UTC77PH UTC77AF |
| A Call from 5412983439 to 101022201181335000000 | will hit the trunk group and roll over to | PTLDORWA3MD PTLDORWA3MD2 |
| A Call from 5412983439 to 101028801181335000000 | will hit the trunk group and roll over to | PTLDOR62AMD6 PTLDOR62AMD2 |
| A Call from 5412983439 to 101023301181335000000 | will go to vacant code | VCAANN |
| A Call from 5412983439 to 14022902075 | will hit the trunk group and roll over to | UTC77PH UTC77AF |
| A Call from 5412983439 to 01181335401212 | will hit the trunk group and roll over to | UTC77PH D138 UTC77AF D138 |

The functionality depicted in Table III will take the form of translation data in switch 123. It is this translation data that can be efficiently verified by the present invention.

At a step 312, active file 120D is identified. Traver list 120A is identified at a step 314, and a connection is established with the desired network element at a step 316. For this example, the desired network element is switch 123. Any necessary security credentials are provided at a step 318 so that access will be granted to switch 123. In a preferred embodiment, a telnet session is established with switch 123, but such a communications session should not be construed as a limitation of the present invention. Alternative ways to access switch 123 include using various protocols such as the file transfer protocol (FTP), Secure Shell, or a variant of the Internet protocol (IP).

At a step 320, the first traver command in traver list 120A is processed. The first traver command is read and issued at switch 123, causing a set of data results to be returned. Thus, at a step 322 the results of the traver command are captured. In a preferred embodiment, these results are captured in active file 120D. At a step 324, a determination is made as to whether there are additional traver commands in traver list 120A to process. If so, the next traver command is submitted at a step 326 and processing reversed to step 322 where its respective data results are captured in active file 120D. If, however, no additional traver commands need to be processed, then a log-off process initiates at a step 328. The log-off process in step 328 may include logging off switch 123 as well as any intermediate devices such as gateways.

If multiple switches 123 are to be queried, then multiple active files 120D can be generated in a preferred embodiment. Alternatively, active file 120D may store all of the data returned. So as to not obscure the present invention, the following example will proceed as though a single switch were being queried, and a single active file 120D is generated. Under such assumptions, active file 120D now includes raw data associated with multiple translation-verification commands. The data in active file 120D will be parsed in a preferred embodiment and compared against a benchmark file 120C.

Benchmark file 120C contains accurate translations-verification data. That is, benchmark file 120C contains data corresponding to desired translation information that should appear in switch 123. The data in benchmark file 120C is deemed correct. The precise format of the data in benchmark file 120C may vary. As will be explained in greater detail below, supplementary data (such as extra lines to facilitate synchronization) may be added to benchmark file 120C. Benchmark file 120C provides a basis for determining whether the data in active file 120D is what it is supposed to be.

No longer will a person have to compare line by line, character by character, the output of serially entered traver commands to determine whether a switch contains correct translation information. Benchmark file 120C can be created before the capture process begins; in which case it is manually populated. Alternatively, benchmark file 120C can be created from the active file 120D itself if the analyst is sure that the current information is correct information. A process of comparing the translations data in active file 120D with that of benchmark file 120C will now be explained in greater detail with reference to FIG. 3B.

Figure 3B:
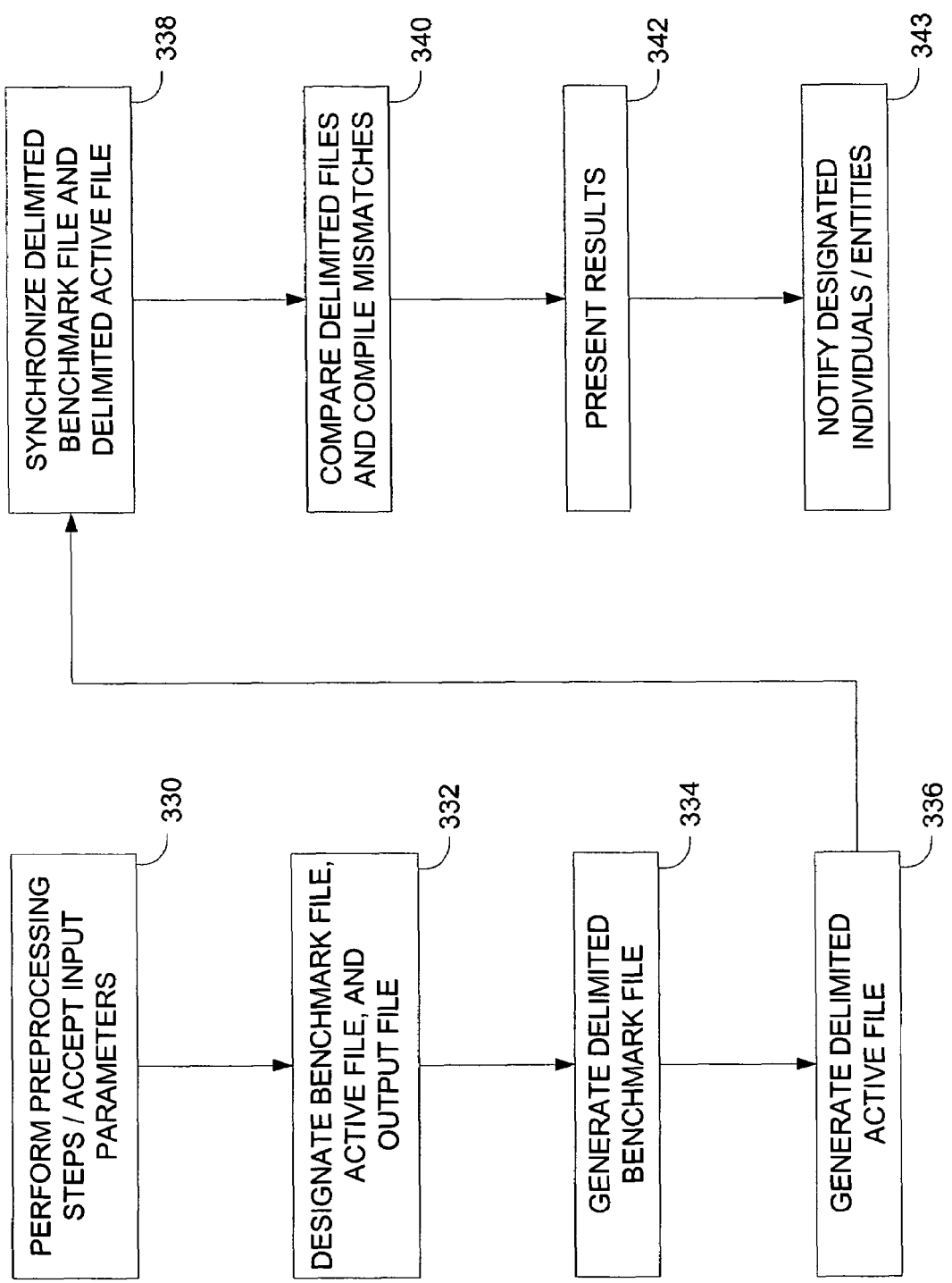
FIG. 3B is a flowchart depicting the compare process in greater detail according to an embodiment of the present invention.

Turning now to FIG. 3B, an exemplary compare process begins at a step 330 where preprocessing steps are performed and input parameters are accepted. At a step 332, benchmark file 120C, active file 120D, and output file 120G are designated. The present invention receives an indication of current translation information (active file 120D), correct translation information (benchmark file 120C), and an output file 120G to be populated. Comparing the data in active file 120D to that which appears in benchmark file 120C can be done in a variety of ways. In a preferred embodiment, each file is delimited and synchronized so that the comparison process becomes simple. The files do not necessarily need to be delimited to be compared, but the following explanation describes merely one illustrative method to compare active file 120D with benchmark file 120C.

At a step 334, delimited benchmark file 120E is generated from benchmark file 120C. Delimited benchmark file 120E is generated by examining each line in benchmark file 120C and adding a desired delimiter to segregate the respected traver commands. An exemplary delimiter includes a line of asterisks. With reference to Table I, when a line beginning with "> traver . . . " is found, then a line of asterisks is written to delimited benchmark file 120E. Alternatively, the traver-initiation commands can be overwritten in either benchmark file 120C or active file 120D instead of generating new files, such as delimited files 120E and 120F.

In still another alternative, delimited benchmark file 120E may simply be provided instead of generated at this stage. But because translation information is not static, benchmark file 120C may desirably contain the correct raw data only. In that case, delimited benchmark file 120E is generated dynamically as illustrated herein. A similar process is used to delimit active file 120D.

As previously mentioned, delimiting benchmark file 120C and active file 120D are not necessary steps but make synchronizing the two files easier in some embodiments. Benchmark file 120C must be synchronized with active file 120D to prevent the occurrence of false negatives. Consider a benchmark file 120C that houses correct translation information. The raw data in benchmark file 120C may appear similar to the data depicted in Table I in the background section above.

After the translations data is captured to active file 120D, mismatches may occur anywhere in the file, including at the top of the active file 120D. If not compensated for, the mismatch could erroneously indicate that all subsequent lines of data in active file 120D do not match those contained in benchmark file 120C. This process is somewhat akin to a person accidentally skipping an answer (but not a question) on a multiple-choice exam. Even though all other answers are correct with respect to the questions with which they respectively correspond, the score of the exam will reflect that a large number of questions were answered incorrectly because the answers do not line up with the questions. Here, if a mismatch occurs early in an active file 120D—for example, four routing commands are associated with the first traver instead of the correct three commands—then all subsequent lines of active file 120D will be offset by one line of data.

Even if all subsequent lines are actually correct data, a line-by-line comparison will produce a set of false-negative results that erroneously indicate apparent mismatches that are not true mismatches. In such a case, benchmark file 120C is padded with an extra line at the correct point so that the remaining lines in benchmark file 120C will accurately reflect correct data that should respectively correspond with lines of translations data in active file 120D. Conversely, if active file 120D returns a set of translations data incident to a traver command that is missing a line of translations data, then a line of data will be padded at that point to delimited benchmark file 120E. The process of synchronizing delimited benchmark file 120E with delimited active file 120F persists through step 338. At the end of step 338, both delimited benchmark file 120E and delimited active file 120F will have the same number of total lines, but the number of lines of data between delimiters, as compared across files, may be different—indicating one or more mismatches.

After files 120E and 120F are synchronized with each other at a step 338, they are compared against each other. A list of mismatches is compiled at a step 340. Because the files are synchronized, a direct comparison between the files is automatically performed without user interaction. Benchmark file 120C contains data that is known to be correct. Any mismatches in delimited active file 120F will correctly be construed as errors.

The results gathered from the comparison in step 340 are then presented to a user at a step 342. Another novel feature offered by the present invention is illustrated with reference to numeral 343, where designated individuals or entities can be notified of all or a portion of the results that occur in output file 120G. Any mismatches between delimited benchmark file 120E and delimited active file 120F are outputted to output file 120G. These mismatches stem from data in a particular switch, such as switch 123. Switch-configuration file 120B includes information related to which individuals or entities are responsible for maintaining correct translations data in that switch. Switch-configuration file 120B can be referenced to determine which switch produced errors. This data can be cross-referenced with data stored in database 122 to retrieve notification information, such as an e-mail address, a web-site address, or other destination address, to send data.

In a preferred embodiment, controller module 112 initiates the process described in FIG. 2, and more particularly in FIGS. 3A and 3B, to run at prescribed intervals. For example, controller module 112 can initiate the aforementioned process on a daily basis. Each day, all of the translation information entered by a number of network-translations analysts will be automatically compared against data known to be correct. Any mismatches will be automatically determined without user intervention and pushed to persons or entities that can assist in correcting the problem. No longer will a communications carrier have to rely on customers to notify it of problems. No longer will a communications carrier have to employ resource-intensive techniques of laboriously determining what translations data is correct data and then using that data as a reference to compare cryptic output. Front-end scripts 124, which are preferably Web scripts, provide a user interface to configure various aspects of the present invention.

Figure 4:
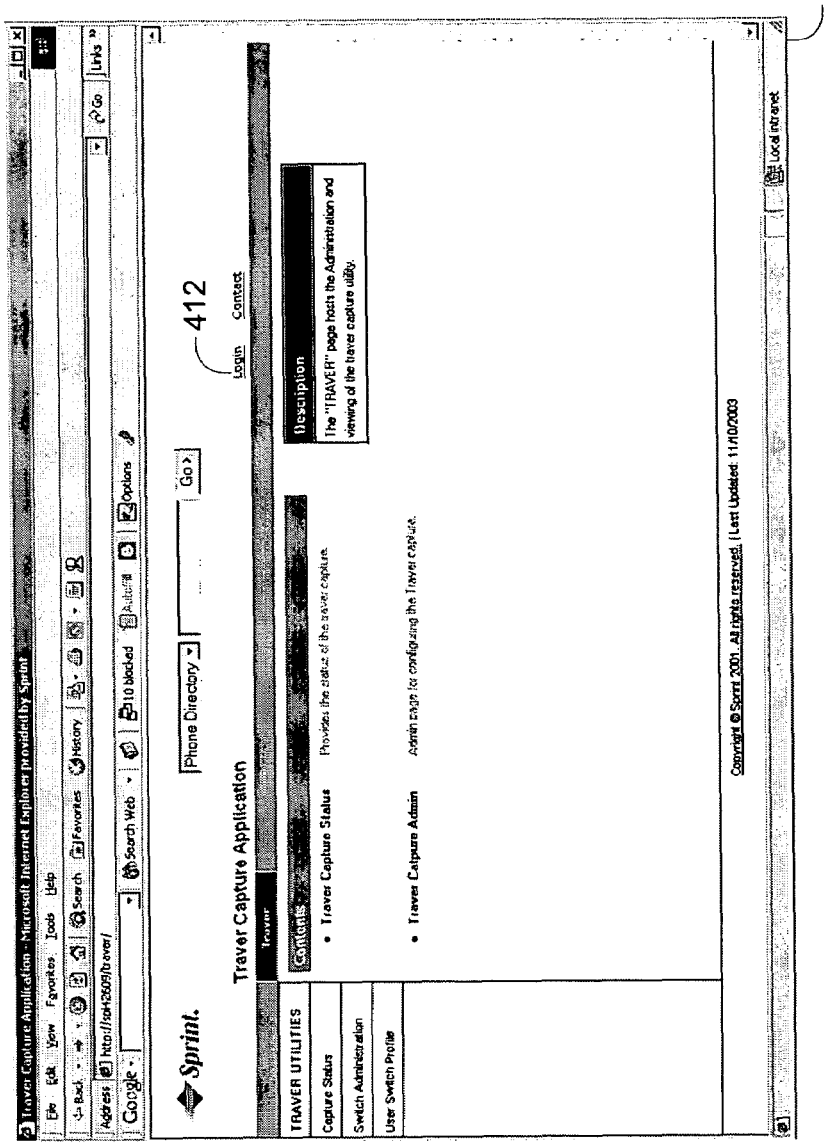

Additional aspects of the present invention can be understood with reference to exemplary selected screenshots that appear in FIGS. 4-12. Turning now to FIG. 4, a screenshot of an introduction page is depicted and referenced generally by the numeral 410. Introduction screen 410 is preferably reached subsequent to a user log-on process. In this embodiment, the information presented throughout the various screens of the application is tailored to a specific user. If the user is not logged in, he or she may do so by selecting a log-in link 412.

Figure 5:
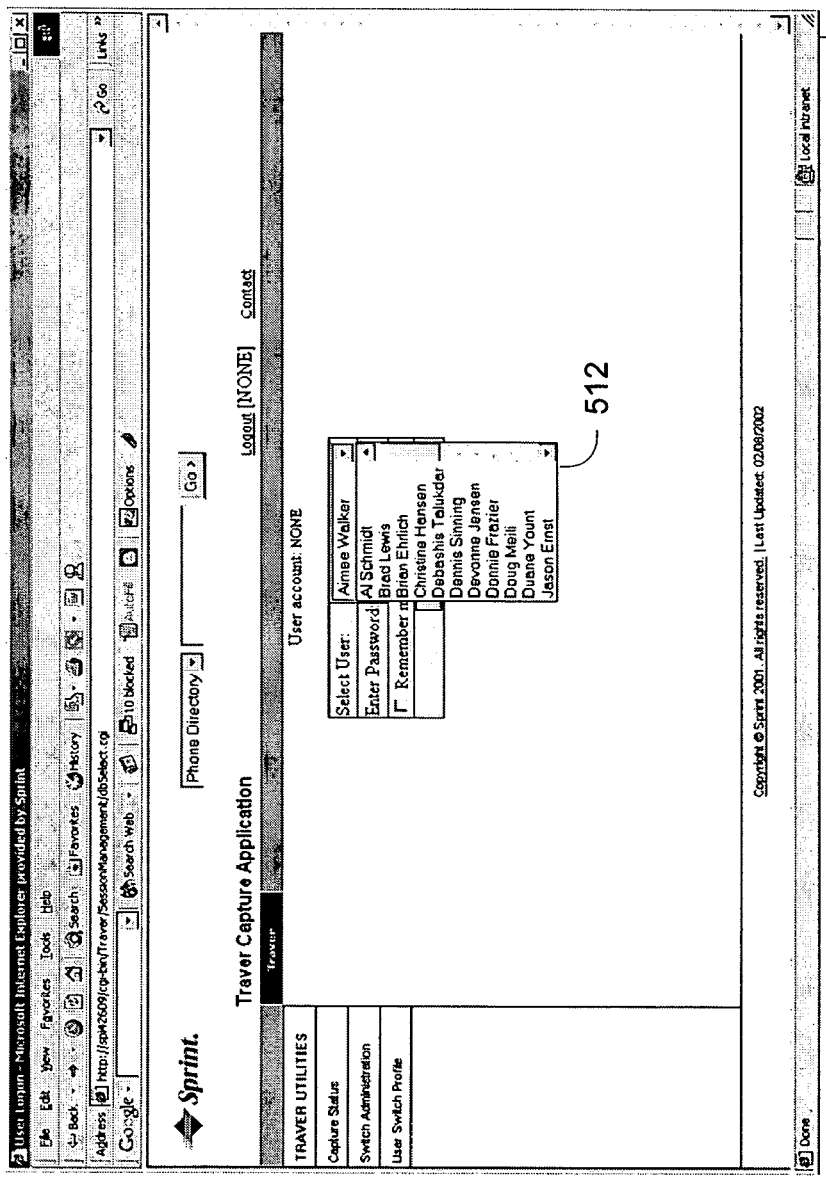

Selecting log-in link 412 causes a log-in screen 510 to be presented to a user, as illustrated in FIG. 5. In a preferred embodiment a drop-down box 512 allows a user to select a user name and then enter a password. If a heightened degree of security is desired, then drop-down box 512 can be replaced with a textbox, set of textboxes, or other controls with which to solicit desired security credentials. After a user logs on to the system, a profile is preferably configured.

FIG. 6 provides an exemplary illustration of a switch-profile list 610. The switch-profile list 610 allows a user to indicate which switches are of interest, or to be queried. In a preferred embodiment, available switches are indicated by shading. As shown, switches 29, 30, 31, and 36 are available to be monitored by the user. To add or remove switches to a person's profile, the respective checkboxes are checked. Clicking an update button 612 saves a user's settings and presents a switch-administration screen 710 as depicted in FIG. 7.

Figure 7:
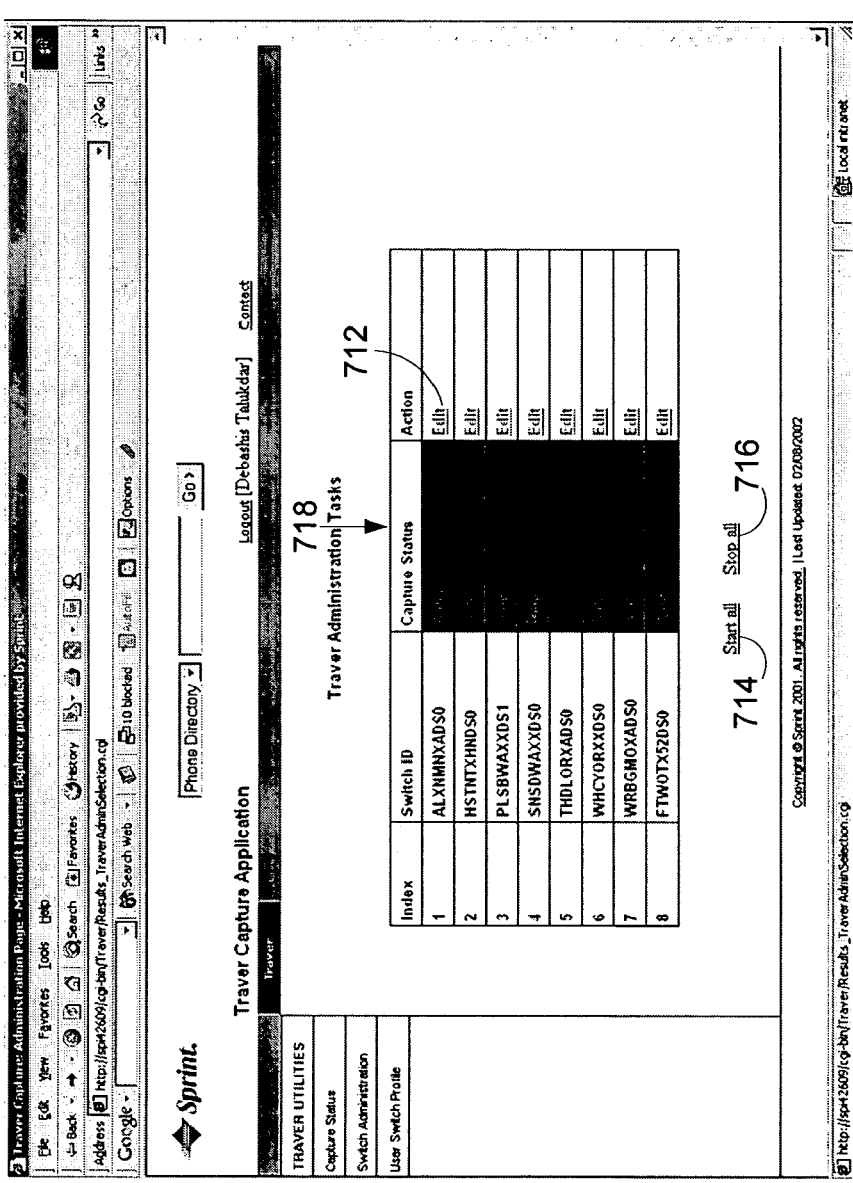

Each of the switches in FIG. 7 has a respective "edit" link indicated by numeral 712. Following "edit" link 712 will open a properties page for the corresponding switch, where changes can be made on the travers that are going to be run. Following this link also allows a user to view current data with respect to benchmark file 120C, active file 120D, and scheduling data to dictate the frequency of running a capture and compare process. Also depicted in screen 710 are a "start all" link 714 and a "stop all" link 716. Each of these links respectively starts or stops capturing translation data on the switches indicated at any given time. A capture-status column 718 indicates whether a switch is currently in a capture state (active) or not (inactive).

When configuring a switch 123 for the first time, benchmark file 120C is preferably set up. The list of travers is provided in traver list 120A. Travers can be run for a trunk, a line, a console, and a virtual facility group. The level of detail can be indicated by providing a "t," "nt," or "v" parameter, as previously mentioned.

Figure 8:
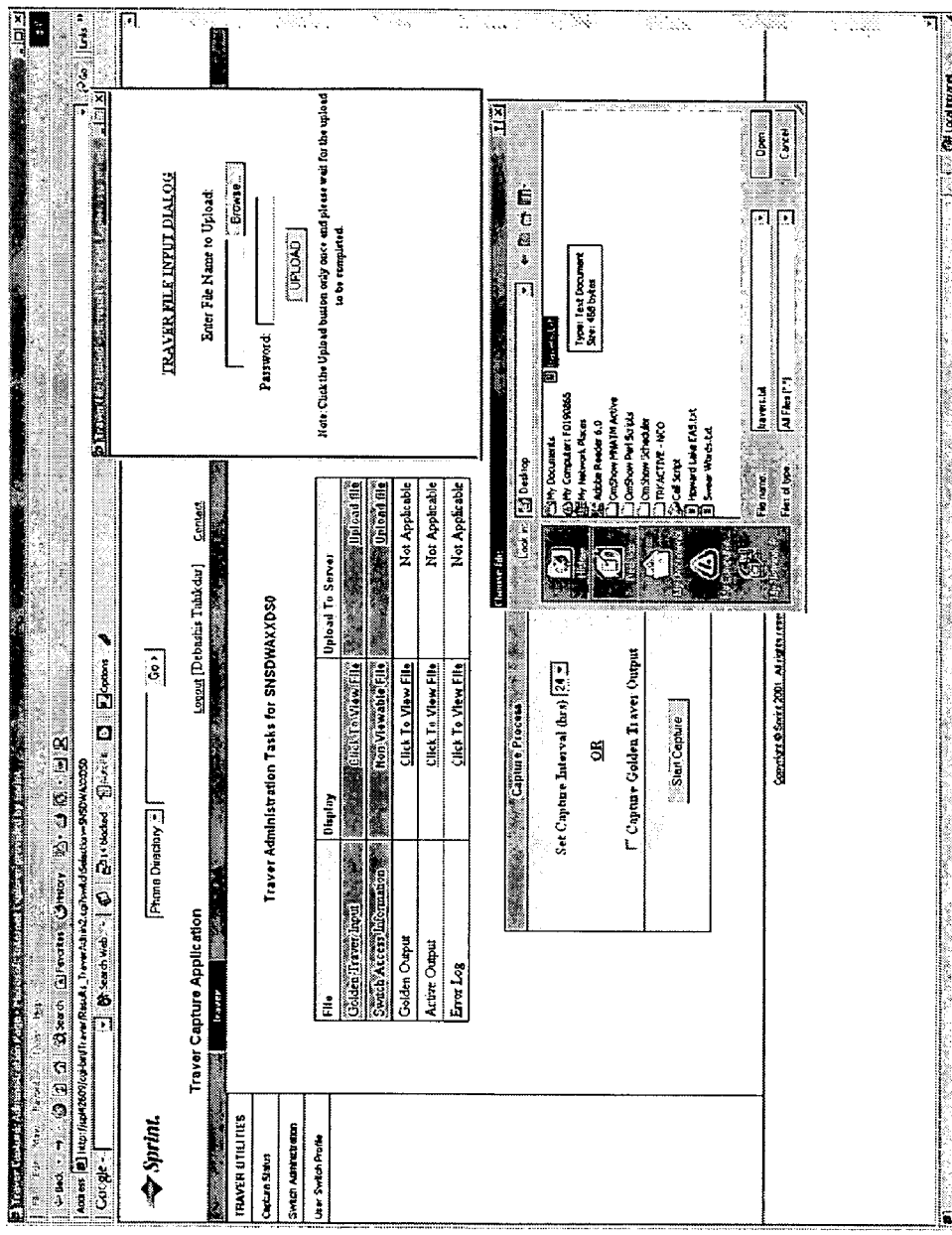

Turning now to FIG. 8, a traver-administration screen 810 is provided. This screen allows the user to designate benchmark file 120C ("golden traver input"), switch-access information, output file 120G, active file 120D, and an error-log file. These files can be viewed or uploaded by following the links as shown. To capture the benchmark file 120C for the first time, a user may select the edit link 712 corresponding to the switch for which the benchmark file is to be created; whereby the user will be presented with the screenshot similar to that of FIG. 9 and referenced generally by the numeral 910.

A user may then check the "capture golden traver output" checkbox 912 and select a start capture button 914. This will initiate the benchmark-file capture process. Once configured, benchmark file 120C is ready to be used as a reference file of correct translations data. Having configured benchmark file 120C, translations-verification information can be captured on a routine basis and compared against the data contained in benchmark file 120C.

Figure 9A:
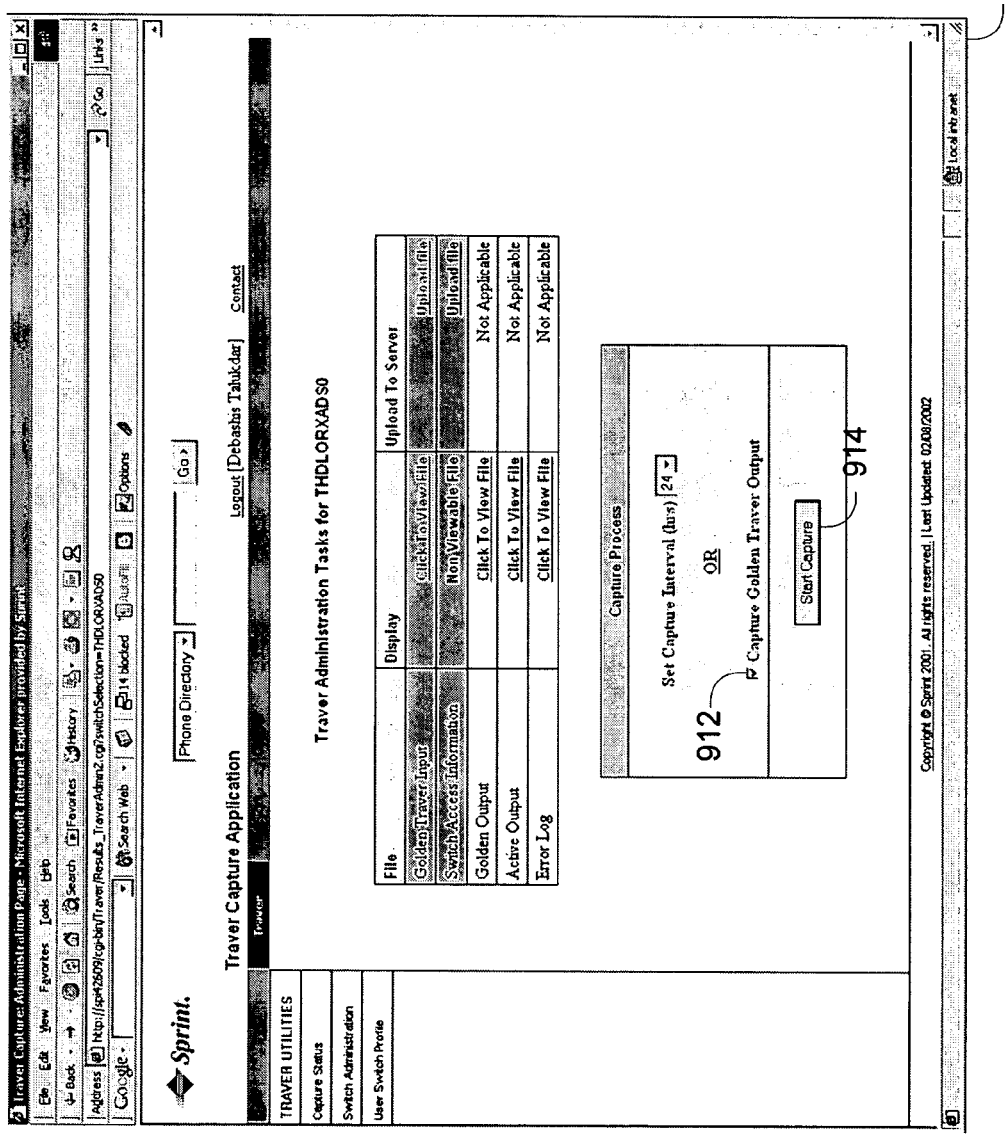
Figure 9B:
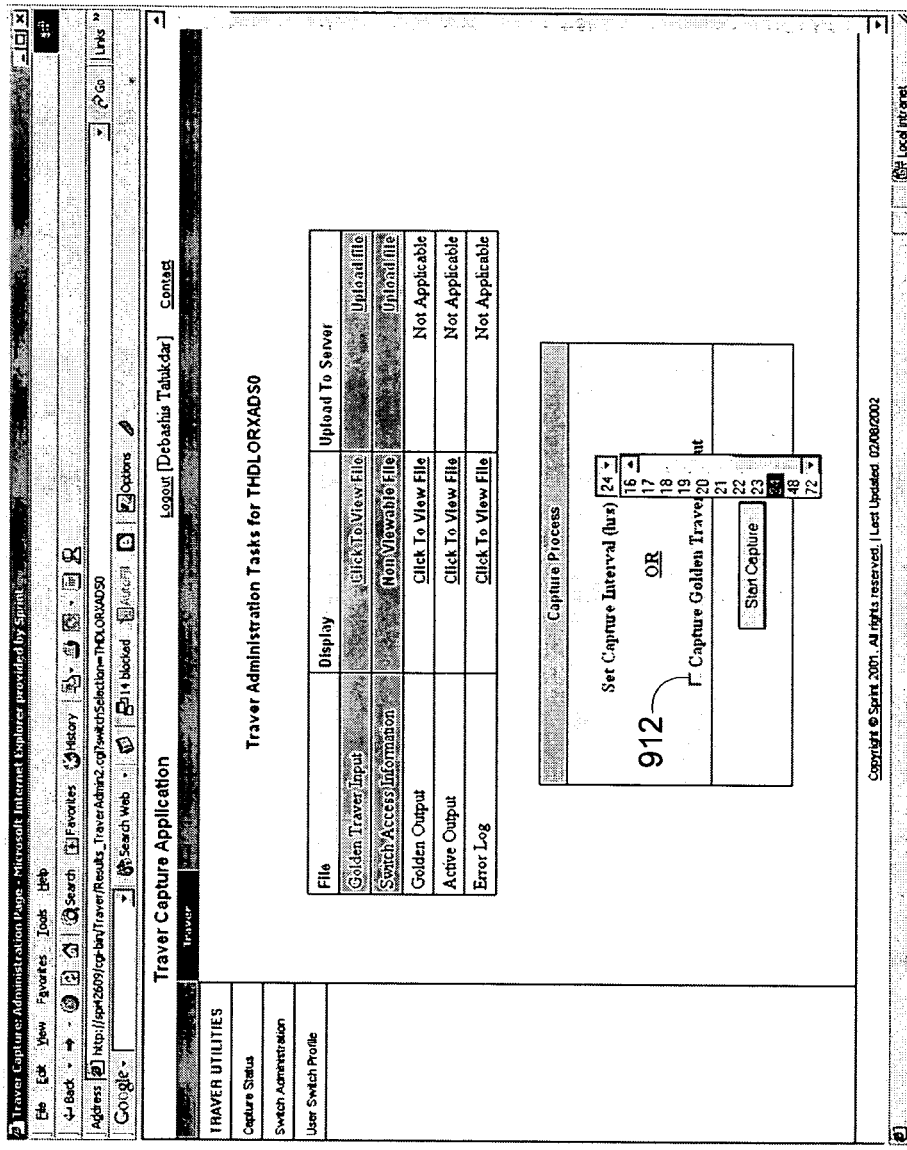

Turning now to FIG. 9B, a method for setting the capture interval is shown. In the embodiment shown, the capture interval is provided in hours, but such a depiction should not be construed as a limitation of the present invention. Rather a capture interval can be set for a matter of minutes, days, weeks, months, etc., according to the various desires and needs of a communications carrier. Checkbox 912 is not checked when scheduling active-file captures.

Figure 10:
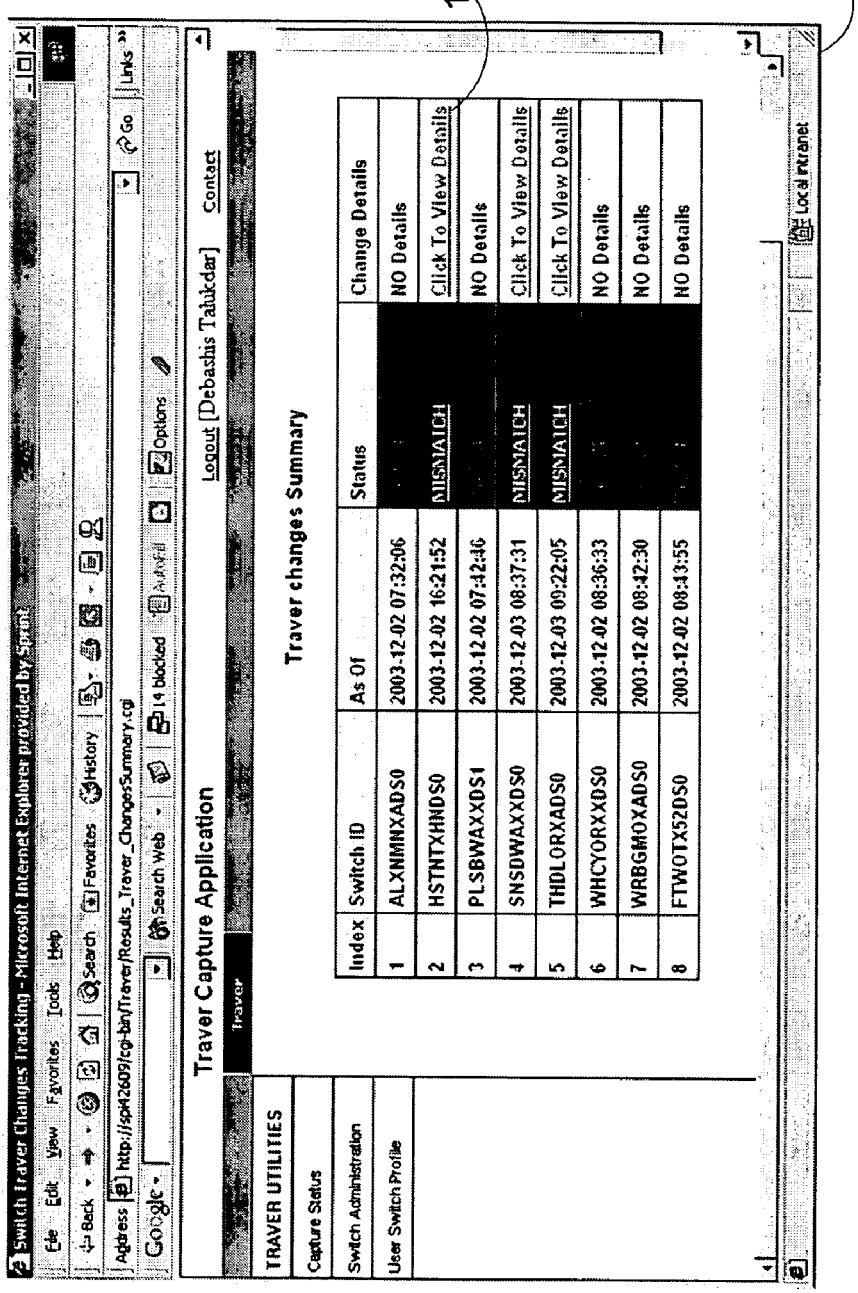
Figure 11:
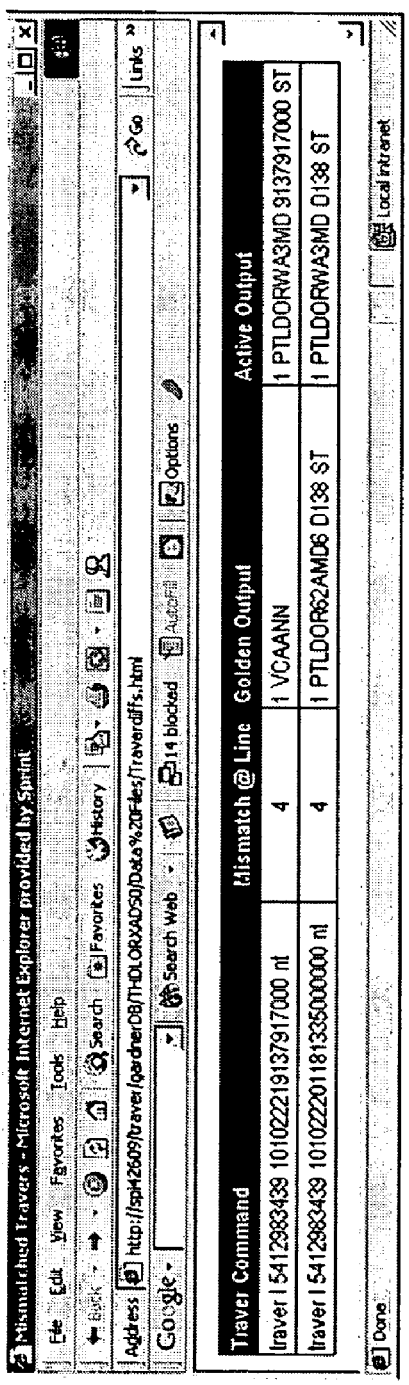

Hours or days may lapse before a mismatch is detected. The present invention can be configured to not send any e-mails, or other notifications, unless a mismatch occurs. If a mismatch does occur, then one or more users can be automatically notified of such error. Screenshot 1010 of FIG. 10 illustrates an example where three mismatches are found. Index numerals 2, 4 and, 5 reflect that three mismatches occurred in the switches shown. Following the "click to view details" link 1012 will present a page specifying the mismatches as shown in the screenshot of FIG. 11. The details show which translations-verification command failed, which line of the output file 120G the mismatch relates to, the expected results, and the current result. Armed with this data, an analyst can correct the problem immediately or perform additional diagnostics.

Figure 12:
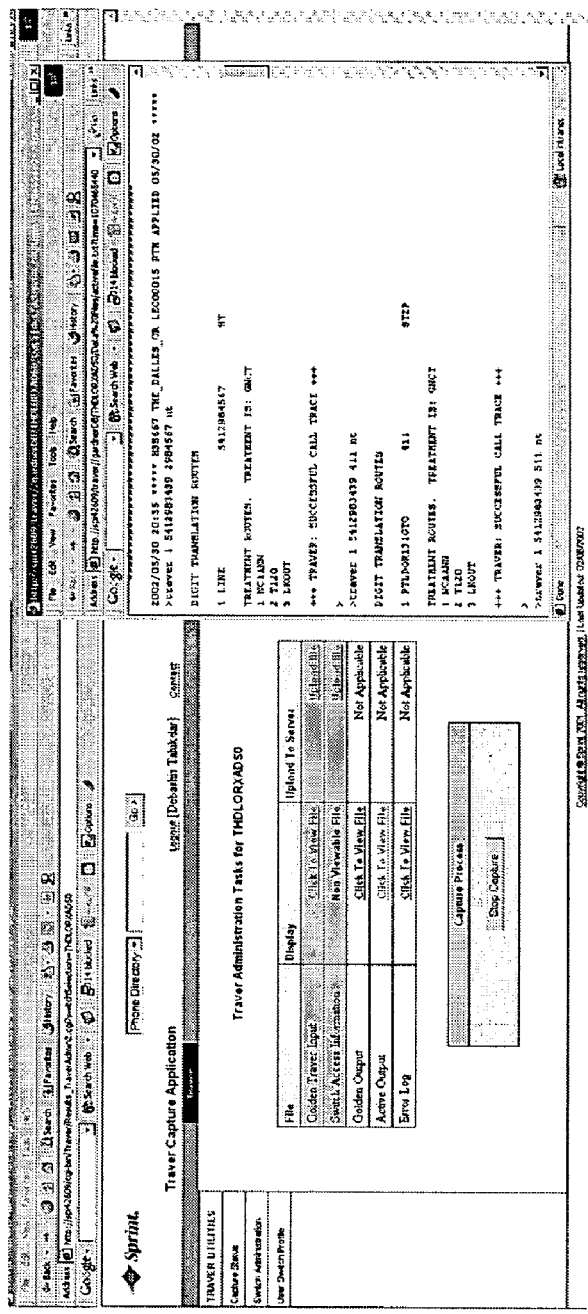

The complete active traver can be viewed by returning to the switch-administration page and clicking "edit" against the switch of interest (see FIG. 7). The data of output file 120G can be viewed by following the "click to view file" link (see FIG. 10). FIG. 12 illustrates that an active file 120D or benchmark file 120C can be viewed directly from the user interface.

As can be seen, the present invention and its equivalents are well adapted to providing a method and system for verifying that correct translation information exists in selected network components. Many different arrangements of the various components depicted, as well as components not shown, are possible without departing from the spirit and scope of the present invention. Those skilled in the art will appreciate the litany of additional network components that can be used in connection with the present invention.

The present invention has been described in relation to particular embodiments, which are intended to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Not all steps of the aforementioned flow diagrams are necessary steps.

The invention claimed is:

1. A computer system having a processor and a memory, the computer system operable to execute a method for verifying translations data related to one or more telecommunications switches, comprising:
   providing a list of a plurality of translation-verification commands, the translation-verification commands used to obtain one or more translation data;
   referencing the list and without user intervention automatically executing each of the plurality of translation-verification commands wherein the plurality of translation-verification commands are executed in the one or more telecommunication switches;
   receiving a plurality of data sets, each respectively corresponding to the plurality of translation-verification commands;
   storing the plurality of data sets in a capture file;
   identifying a benchmark file that contains correct translations data;
   synchronizing the capture file and the benchmark file to contain the same number of lines of data;
   without user intervention, comparing the plurality of data sets in the capture file with those in the benchmark file to identify any data mismatches;
   upon identifying a data mismatch, automatically notifying one or more entities of the data mismatch, the data mismatch indicating one or more incorrect translation data associated with one or more of the one or more telecommunications switches.

2. The system of claim 1, wherein providing a list of commands that extract routing information from a network element.

3. The system of claim 2, wherein synchronizing the capture file and the benchmark file includes:
   generating a first file based on the capture file; and
   generating a second file based on the benchmark file, wherein the first and second files have equal numbers of lines of data.

4. The system of claim 3, wherein comparing the plurality of data sets includes determining whether any characters of data on a line in the capture file are different than a respective character on a corresponding line of data in the benchmark file.

5. The system of claim 3, wherein comparing the plurality of data sets includes determining whether a file size of the capture file is equal to a file size of the benchmark file.

6. The system of claim 3, further comprising storing details related to the mismatches in an output file.

7. The system of claim 6, wherein the details include one or more of the following:
   a translations-verification command that failed;
   an indication of which line of the output file to which the mismatch relates;
   an expected result;
   an actual current result;
   a network-element identifier that identifies which network element houses erroneous information; and
   a timestamp.

8. The system of claim 7, further comprising presenting one or more of the details on a user interface.

9. The system of claim 7, further comprising communicating one or more of the details to a destination point, wherein the destination point is an e-mail address, a Website address, an Internet address, a phone number, or a target-element address.

10. One or more computer-readable media having computer-useable instructions embodied thereon for performing a method of troubleshooting problems related to one or more telecommunications switches, the method comprising:
    providing a first data set containing data known to be correct, the first data set including one or more correct translation data;
    retrieving a second data set containing current data from one or more telecommunication switches of the network;
    without user intervention, comparing the first data set with the second data set;
    automatically identifying discrepancies between the first data set and the second data set; and
    upon identifying a discrepancy, automatically notifying one or more entities of the discrepancy, the discrepancy indicating one or more incorrect translation data associated with one or more of the one or more telecommunications switches.

11. The media of claim 10, wherein:
    the first data set contains correct translation data; and
    the second data set contains current translation data.

12. The media of claim 11, wherein retrieving the second data set comprises:
    executing a plurality of translation-verification commands on one or more elements; and
    storing the second set of data in a capture file.

13. The media of claim 12, wherein comparing the first data set with the second data set includes comparing portions of the first data set to corresponding portions of the second data set on a per-translations-verification-command basis.

14. The media of claim 13, wherein automatically identifying discrepancies between the first data set and the second data set includes providing details related to data in the second data set that does not match corresponding data in the first data set.

15. The media of claim 14, further comprising presenting all or a portion of the details on a presentation device.

16. The media of claim 14, further comprising:
without user intervention, communicating all or a portion of the details to the one or more entities.

17. The media of claim 16, wherein communicating all or a portion of the details to the one or more entities includes:
referencing a database communicatively coupled to the one or more network elements;
identifying one or more entities responsible for maintaining the one or more network elements; and
identifying contact information associated with the one or more identified entities.

18. A computer-implemented method for verifying one or more translations data in one or more telecommunications switches, the method comprising:

providing a list of a plurality of translation-verification commands, the translation-verification commands used to obtain the one or more translations data;
referencing the list and automatically executing each of the plurality of translation-verification commands;
receiving a plurality of data sets, each respectively corresponding to the plurality of translation-verification commands;
storing the plurality of data sets in a capture file;
identifying a benchmark file that contains correct translations data;
synchronizing the capture file and the benchmark file to contain the same number of lines of data;
without user intervention, comparing the plurality of data sets in the capture file with those in the benchmark file to identify any data mismatches; and
upon identifying a data mismatch, automatically notifying one or more entities of the data mismatch, the data mismatch indicating one or more incorrect translations data associated with one or more of the one or more telecommunications switches.

* * * * *